United States Patent [19]

Bartz

[11] Patent Number: 5,925,109
[45] Date of Patent: Jul. 20, 1999

[54] SYSTEM FOR I/O MANAGEMENT WHERE I/O OPERATIONS ARE DETERMINED TO BE DIRECT OR INDIRECT BASED ON HARDWARE COUPLING MANNERS AND/OR PROGRAM PRIVILEGE MODES

[75] Inventor: Christopher T. Bartz, Austin, Tex.

[73] Assignee: National Instruments Corporation, Austin, Tex.

[21] Appl. No.: 08/630,387

[22] Filed: Apr. 10, 1996

[51] Int. Cl.⁶ ..................................................... G06F 13/14
[52] U.S. Cl. .................................................. 710/14; 710/8
[58] Field of Search ........................... 380/49; 395/183.1, 395/651, 674, 737, 856, 500, 827, 872, 834, 828; 707/1; 235/492; 370/248

[56] References Cited

U.S. PATENT DOCUMENTS

| | | | |
|---|---|---|---|
| 3,828,327 | 8/1974 | Berglund et al. | 395/737 |
| 4,794,515 | 12/1988 | Hornung | 395/674 |
| 4,807,178 | 2/1989 | Fujiwara et al. | 364/900 |
| 4,887,202 | 12/1989 | Tanaka et al. | 364/200 |
| 5,237,616 | 8/1993 | Abraham et al. | 380/49 |
| 5,260,555 | 11/1993 | Sakamoto | 235/492 |
| 5,297,262 | 3/1994 | Cox et al. | 395/856 |
| 5,353,411 | 10/1994 | Nakaosa et al. | 395/651 |
| 5,491,804 | 2/1996 | Heath et al. | 395/275 |
| 5,574,903 | 11/1996 | Szymanski et al. | 707/1 |
| 5,625,621 | 4/1997 | Christensen et al. | 370/248 |
| 5,659,679 | 8/1997 | Alpert et al. | 395/183.1 |

*Primary Examiner*—Thomas C. Lee
*Assistant Examiner*—Chien Yuan
*Attorney, Agent, or Firm*—Conley, Rose & Tayon; Jeffrey C. Hood

[57] ABSTRACT

The system and method simplifies communication between a computer control program executing on the computer system and an input/output device coupled to the computer system and is independent of the privilege mode in which the computer program is executing and of the manner in which the input/output device is coupled to the computer system, namely directly such as via an expansion bus versus indirectly such as via a parallel port. An I/O manager provides input/output operation macros, comprising first and second conditional execution portions, along with other related functions. The computer program is compiled from one or more source code files, wherein the source code files employ the input/output operation macros and call other I/O manager functions. The system and method comprises a preprocessor resolving the first conditional execution portion of an input/output operation macro into a direct input/output instruction if compiled for an execution environment with sufficient privilege level and resolving the first conditional execution portion of the macro to a call to a function otherwise. The function causes the computer system to change to kernel mode and executes a direct input/output instruction. The system and method further comprises executing the compiled computer program comprising allocating memory for and populating an instance of a data structure for the I/O manager and determining whether or not the input/output device is coupled to the computer system such that the input/output device registers are directly accessible to the computer program through a direct input/output instruction. Next, the input/output operation to the input/output device is performed by executing the first conditional execution portion of the input/output operation macro to the input/output device if the input/output device is directly coupled to the computer system or executing the second conditional execution portion of the input/output operation macro, which is a function, if the input/output device is not directly coupled to the computer system, wherein the function performs the input/output operation by executing a plurality of direct input/output instructions.

31 Claims, 4 Drawing Sheets

```
1
2
3
4  #define  DIRECT_COUPLE(handle)        ((handle & DIRECT_MASK_BITS) == DIRECT_HANDLE)
5  #define  WRITE_REG_8(handle, regOffset, data)                                        \
6              (DIRECT_COUPLE(handle)                                         ?         \
7                  IOMgrOutB(BASE_ADDR(handle)+regOffset, data)               :         \
8                  handle->writeReg8(handle, regOffset, data)
9
10 #ifdef   PRIVILEGED_MODE
11
12 #define  IOMgrOutB(reg, data)    outp(reg, data)   /* library routine which performs direct I/O */
13
14 #else
15
16 int IOMgrOutB(int ioAddr, int data)
17 {
18          iomgrParamBlock pb;
19
20          /* Initialize the kernel mode parameter block. */
21          pb.parameter.outByte.ioAddr    = ioAddr;
22          pb.parameter.outByte.data      = data;
23
24          /* Invoke the kernel routine to perform the I/O operation. */
25          callToKernel(IO_MANAGER_ID, &pb, sizeof (iomgrParamBlock));
26 }
27
28 #endif
29
30 main()
31 {
32          int handle, isrModeHandle;
33
34          /* Initialize the I/O Manager and get a handle which indicates whether or not
35          ** the data acquisition card may be accessed in a direct manner or not. */
36          handle = initIOMgr(slotIndex + 1, (IOMgrBaseAddr) 0, ioMethod);
37
38          /* Initialize the parallel port specific portion of the I/O Manager */
39          if (IS_LPT_DEVICE(deviceType))
40                  initIOMgrPPData(handle, pPort);
41
42          /* get a kernel mode handle */
43          isrModeHandle = get ISRIOMgrHandle(handle);
44
45          /* Write a value to a register, such as a voltage. */
46          WRITE_REG_8(handle, regOffset, data);
47
48          /* Get any errors generated by the I/O operation. */
49          errors = getAndClearIOMgrErr(handle);
50
51          /* Free the memory used by the I/O Manager. */
52          freeIOMgr(handle);
53 }
```

FIG. 3

SYSTEM FOR I/O MANAGEMENT WHERE I/O OPERATIONS ARE DETERMINED TO BE DIRECT OR INDIRECT BASED ON HARDWARE COUPLING MANNERS AND/OR PROGRAM PRIVILEGE MODES

BACKGROUND OF THE INVENTION

1. Field of the Invention

The present invention relates to the field of input/output (I/O) management, and more particularly to an intelligent I/O manager which abstracts I/O functions between a computer system and a data acquisition card, wherein the data acquisition card may be designed for one of a plurality of different hardware platforms, and wherein the computer program operates in a plurality of privilege modes.

2. Description of the Related Art

Computer system expansion devices, or input/output (I/O) devices, may be coupled to computer systems in a variety of manners. Typically, a computer program executing on a computer system communicates with the input/output device via storage components, such as registers or memory, to control and/or receive information from the input/output device. A read/write from/to a storage component on an input/output device is henceforth referred to as an input/output operation. The manner in which the input/output device is coupled to the computer system in part determines the manner in which the computer program communicates with the input/output device, that is, the manner in which the input/output operations are performed.

One manner of coupling input/output devices to a computer system allows a computer program executing on the computer system to perform input/output operations by executing direct input/output instructions which read/write registers located on the input/output device. An example of such a coupling manner is through an expansion bus. Examples of currently available expansion buses are the AT or ISA (Industry Standard Architecture) bus, the EISA (Extended Industry Standard Architecture) bus, and the PCI (Peripheral Component Interconnect) bus. In addition, the input/output device may be configured as a PCMCIA (Personal Computer Memory Card International Association) card, also referred to as a PC card. The registers of input/output devices which have these interfaces are accessible by the computer program executing direct input/output instructions.

A second manner of coupling input/output devices to a computer system requires a computer program to communicate with the input/output device by a more indirect means. In other words, the registers on the input/output device are not directly accessible by a direct input/output instruction of the computer system. Examples of the indirect coupling manner include different types of I/O interfaces or platforms, including the VXI bus (VME Extensions for Instrumentation) bus, and the GPIB (General Purpose Interface Bus), among others. These interfaces are popular in the instrumentation or test measurement industry. In addition, the input/output device may be adapted for indirectly coupling to a computer system via a serial port or parallel port.

In many cases it is desired for a computer program executing on a computer system to be able to communicate with expansion or input/output devices in a portable manner, i.e., regardless of how the expansion device is coupled to the computer system. In other words, software developers for such devices desire to develop portable code which is highly reusable and maintainable by virtue of its hardware platform independence.

One area where a portable computer program is desired is in the field of data acquisition. For example, a data acquisition card which is software controlled may be coupled to the computer system by any of the various interfaces described above. The computer program causes the computer system to generate a plurality of bits which are provided to the data acquisition card which configure and/or control the data acquisition card or cause the data acquisition card to provide data in response. These plurality of bits differ depending upon the type of platform for which the data acquisition card is configured, including the manner in which the card is coupled to the system. In other words, different bits are required to be transferred to the data acquisition card, depending upon whether the card is configured to reside on an expansion bus, such as the PCI bus, is coupled to a serial or a parallel port, is a PCMCIA card, or is a VXI or GPIB card.

Computer programs which communicate with input/output devices execute under the supervision of operating systems running on the computer system. Examples of such operating systems include "UNIX", "MS-DOS", "WINDOWS", "WINDOWS NT", the "MACINTOSH" operating system, etc. For security purposes, operating systems typically employ one or more different privilege modes in which computer programs execute. The operating systems are configured such that certain operations, such as the execution of input/output instructions, the execution of instructions which access particular memory ranges, etc., may only be executed in certain privilege modes. The same code reusability and maintainability issues which exist in regard to the input/output device coupling manners, as described above, also exist in regards to privilege modes.

Therefore, an improved system and method is desired for enabling a single computer program to communicate with an expansion device or expansion card regardless of the I/O platform in which the expansion device is configured and regardless of the privilege mode in which the computer program is executing with respect to the operating system running on the computer system.

SUMMARY OF THE INVENTION

The present invention comprises a system and method for performing input/output management in a computer system. The system and method of the present invention simplifies communication between a computer control program executing on the computer system and an input/output device coupled to the computer system. The system and method is independent of the privilege mode in which the computer program is executing with respect to the operating system running on the computer system. The system and method is also independent of the manner in which the input/output device is coupled to the computer system. An I/O manager according to the present invention provides input/output operation macros, comprising first and second conditional execution portions, along with other related functions. The computer program is compiled from one or more source code files which employ the input/output operation macros and call other input/output manager functions. The input/output manager thus provides a means for source code to be developed which is portable across hardware platforms, i.e., input/output coupling manner, across operating system privilege level differences.

The system and method comprises compiling the source code files into the computer program, wherein the compiling comprises determining if the computer program is to execute in a first privilege mode or a second privilege mode. In the first privilege mode the computer program is permitted by the operating system to execute a direct input/output instruction, such as an x86 architecture "in" or "out" instruction, to the input/output device. In the second privilege mode, the computer program is not permitted by the operating system to execute a direct input/output instruction to the input/output device. If the computer system is in the first privilege mode, the first conditional execution portion of the input/output operation macro is resolved to a direct input/output instruction. If the computer system is in the second privilege mode, the first conditional execution portion of the input/output operation macro is resolved to a call to a function, wherein the function causes the computer to change to the first privilege mode and execute a direct input/output instruction in the first privilege mode.

The system and method further comprises executing the computer program on the computer system. First the input/output manager is initialized. The input/output manager determines if the input/output device is coupled to the computer system in a first coupling manner or a second coupling manner in response to the computer program initializing the input/output manager. The first coupling manner comprises the input/output device being coupled to the computer system such that the input/output device is directly accessible to the computer program through a direct input/output instruction. The second coupling manner comprises the input/output device being coupled to the computer system such that the input/output device is not directly accessible to the computer program through a direct input/output instruction.

After the coupling manner is determined, the input/output operation to the input/output device is performed by executing the first conditional execution portion of the input/output operation macro to the input/output device if the input/output device is coupled to the computer system in the first coupling manner. If the input/output device is coupled to the computer system in the second coupling manner the input/output manager executes the second conditional execution portion of the input/output operation macro which is a function, wherein the function performs the input/output operation by executing a number of direct input/output instructions.

BRIEF DESCRIPTION OF THE DRAWINGS

A better understanding of the present invention can be obtained when the following detailed description of the preferred embodiment is considered in conjunction with the following drawings, in which:

FIG. 3 is a C language source code fragment which illustrates aspects of the preferred embodiment of the present invention;

DETAILED DESCRIPTION OF THE PREFERRED EMBODIMENT

Input/Output Manager

Figure 1:
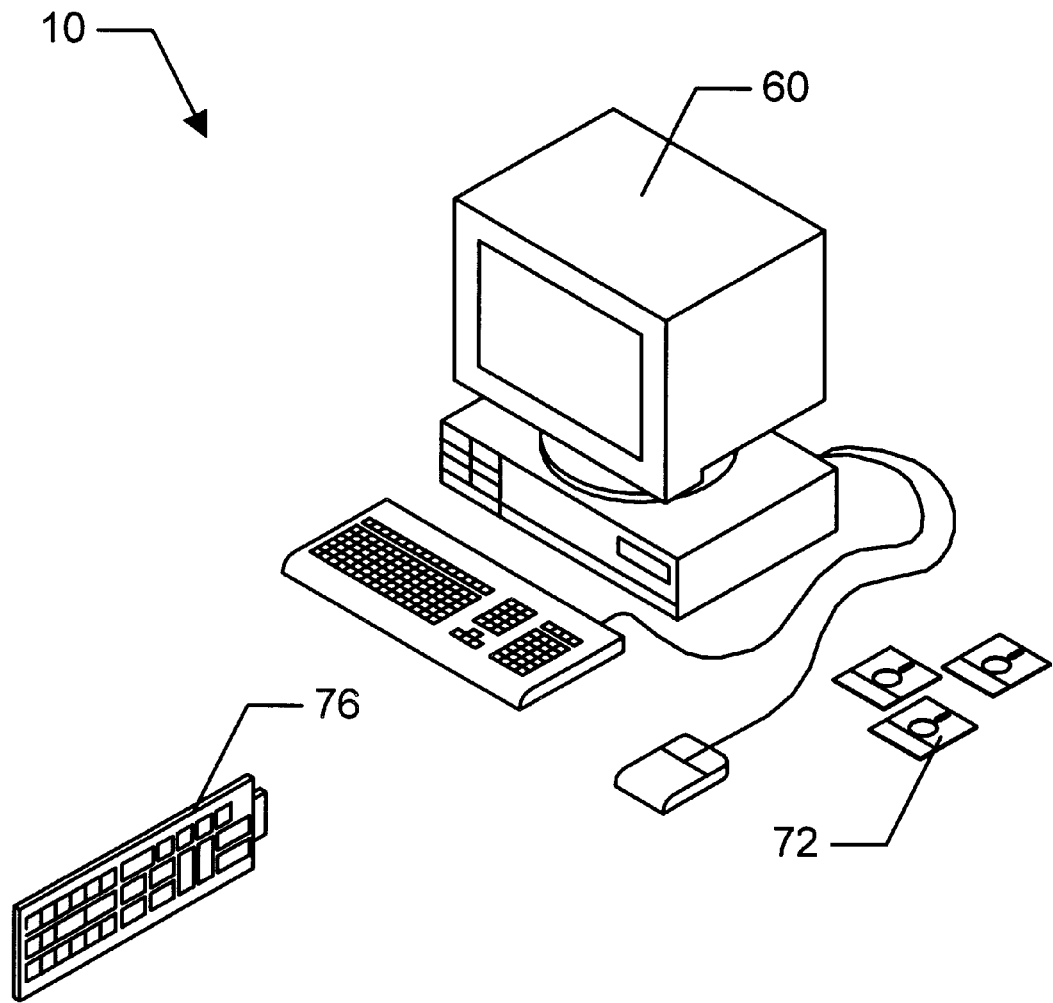
FIG. 1 illustrates a data acquisition system according to the present invention.

Referring now to FIG. 1, a data acquisition system 10 is illustrated in which I/O management is performed according to the present invention. The data acquisition system 10 preferably comprises a general purpose computer system 60. The computer system 60 preferably includes various standard components, including one or more processors, one or more buses, a hard drive and memory. A data acquisition card 76 is comprised in or coupled to the computer system 60.

The data acquisition card 76 is coupled to an instrumentation and/or control system (not shown). The instrumentation and/or control system may be any of various types of systems. Examples of such an instrumentation and/or control system are systems in power generation stations, chemical producing plants, manufacturing facilities, etc. The data acquisition card 76 acquires data from the instrumentation and/or control system and communicates the data to the computer system 60. The data acquisition card 76 is coupled to computer system 60 by one of a plurality of means such as by a parallel port, serial port, VXI bus, GPIB bus, ISA bus or PCI bus, or other types of buses or platforms.

An example of the data acquisition card 76 is the AT-MIO-16XE-50 card, produced by National Instruments Corporation, which is coupled to the computer system 60 through an ISA bus. Another example of the data acquisition card 76 is the DAQPad-MIO-16XE-50 card, also produced by National Instruments Corporation, which is coupled to the computer system 60 through a parallel port. It is contemplated that the data acquisition card 76 may in fact have various forms, such as a single chip or chipset, or even be incorporated into a larger chip or card as one of multiple functions on the chip or card.

A computer program, represented by floppy disks 72, executing on the computer system 60 communicates with the data acquisition card 76 to control the data acquisition card 76 and retrieve the data from the data acquisition card 76.

Figure 2:
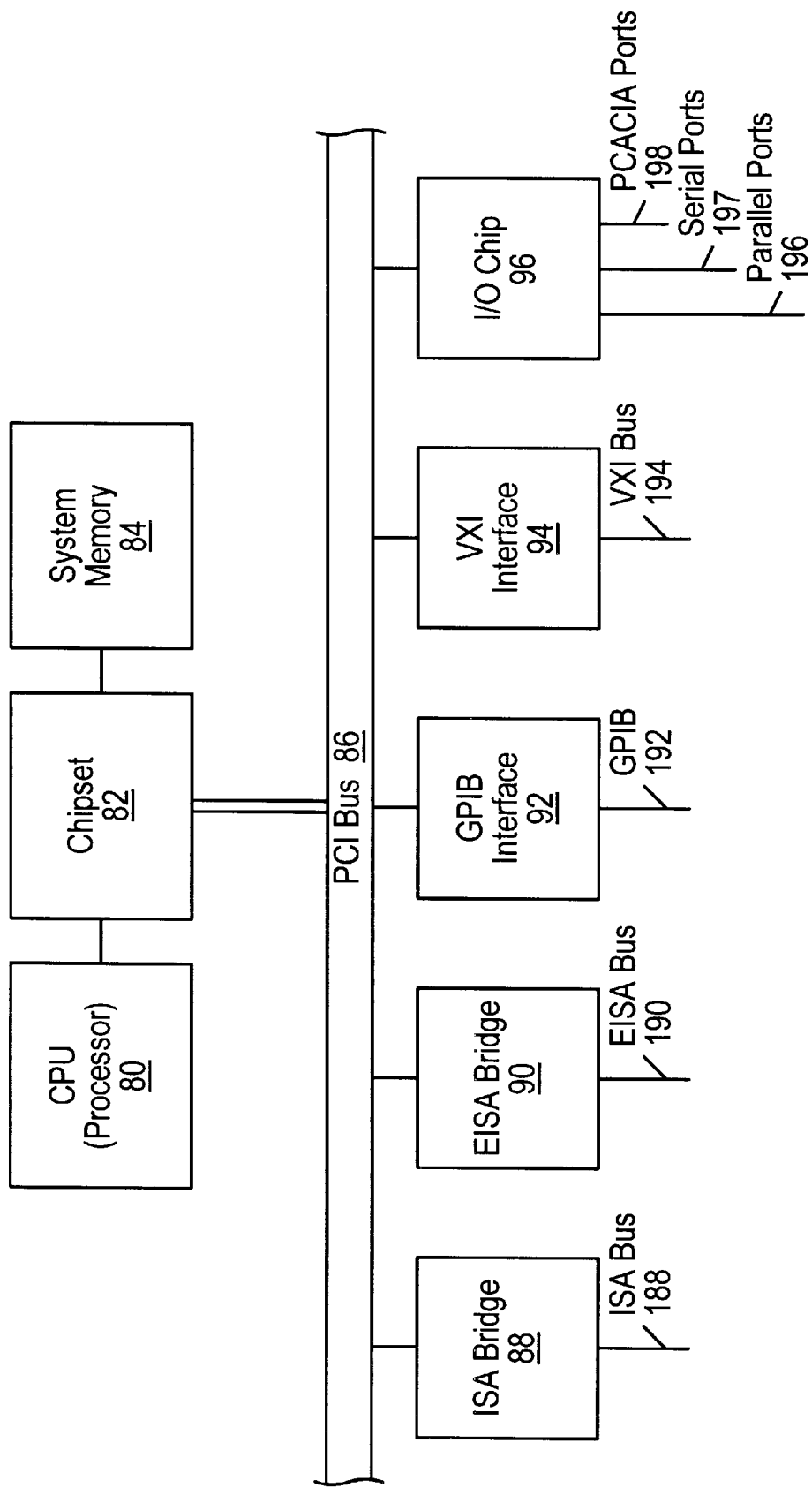
FIG. 2 is a block diagram illustrating the computer system of FIG. 1.

Referring now to FIG. 2, a block diagram illustrating the components comprised in the computer system 60 of FIG. 1 is shown. It is noted that FIG. 2 is illustrative only, and other computer architectures may be used, as desired. As shown, the computer system includes at least one processor 80 coupled through chipset logic 82 to a system memory 84. The chipset 82 preferably includes a PCI (Peripheral Component Interconnect) bridge for interfacing to PCI bus 86. ISA Bridge 88, EISA Bridge 90, GPIB interface card 92, and VXI interface card 94 are shown connected to PCI bus 86 which provide ISA bus 188, EISA bus 190, GPIB 192, and VXI bus 194 respectively. I/O chip 96 is shown connected to PCI bus 86 which provides one or more parallel ports 196, one or more serial ports 197, and PCMCIA ports 198. Various other components may be comprised in the computer system, such as video (not shown) and hard drive (not shown). The data acquisition card 76 (of FIG. 1) is coupled to the computer system 60 by one of the plurality of PCI bus 86, ISA bus 189, EISA bus 190, GPIB 192, VXI bus 194, parallel ports 196, serial ports 197 or PCMCIA ports 198 shown.

Referring now to FIG. 3, a C language source code listing is shown which illustrates various aspects of the preferred embodiment of the present invention. The main routine at line 30 contains statements which are indicative of statements included in the computer program (of FIG. 1) which communicates with the data acquisition card 76 (of FIG. 1). The computer program communicates with the data acquisition card 76 through the services of an input/output manager also executed by the computer system 60 (of FIG. 1).

The input/output manager comprises a plurality of functions and macros called by the main routine. Additionally, the input/output manager defines data structure type 3 which enable the main routine to pass information to the input/output manager, receive information from the input/output manager and request the input/output manager to perform input/output operations. The input/output manager also defines constants and other information which the computer program uses to communicate with the input/output manager. The function definitions, data type definitions, constants and other information which define the interface to the input/output manager are found in the iomgr.h, iomgrg.h, iomgrp.h and iomgr.c files listed at the end of the specification.

The main routine initializes an instance of the input/output manager by calling the initIOMgr routine at line 36. In the call to initIOMgr, the main routine passes information to the input/output manager about the data acquisition card 76, namely the manner in which the data acquisition card 76 is coupled to the computer system 60 and the expansion slot number in the event that the card resides in an expansion slot. The input/output manager defines constants associated with manners in which the data acquisition card 76 is coupled to the computer system 60. Examples of these manners, or interfaces, are the ISA bus, the NuBUS, the PCI bus, PCMCIA or PC Card, parallel port, serial port, SCXI port, GPIB, VXI, etc. Constants defining these manners, or methods, are found in the iomgr.h header file listed at the end of the specification. Initializing an instance of the input/output manager comprises allocating memory for an instance of a data structure associated with the data acquisition card 76. Specifically, memory is allocated for an instance of an IOMgrHndlStructType data structure, which is defined in the iomgrp.h header file listed at the end of the specification. The input/output manager then initializes fields in the data structure. The input/output manager populates fields which denote the coupling manner, the base address of the data acquisition card 76, etc. based on the information passed by the main routine. The input/output manager also populates the various function pointers in the data structure to point to functions which perform input/output operations from/to the data acquisition card 76. An example of a function pointer field in the data structure is the writeReg8 field, which the input/output manager initializes to point to a function which performs an output operation to an 8 bit register.

After performing the initialization, the initIOMgr routine returns a handle to the main routine. The handle is used by the main routine in further communications with the input/output manager. There are two types of handles which the initIOMgr routine returns depending upon the manner in which the data acquisition card 76 is coupled to the computer system 60. The determination is based upon whether or not the computer program may execute a direct input/output instruction to the storage components on the data acquisition card 76, such as registers or memory.

If the data acquisition card 76 is coupled to the computer system 60 in a first manner such that the computer program may execute direct input/output instructions to registers on the data acquisition card 76 then the initIOMgr routine returns a handle in which the base I/O address, commonly referred to as the port address, of the data acquisition card 76 is encoded. Examples of this direct coupling manner are the ISA bus, the PCI bus, and PCMCIA. The computer system processor 80 (of FIG. 2) executing the computer control program executes a single direct input/output instruction to read or write a register on the data acquisition card 76. Examples of the direct input/output instructions are the "in" and "out" instructions found on x86 architecture microprocessors. These two instructions require as a parameter the address in I/O space of the register to be read or written. The base I/O address of the device is used, along with the offset of the desired register, to compute the I/O address of the register.

If the data acquisition card 76 is coupled to the computer system 60 in a second manner such that the computer program may not execute a direct input/output instruction to registers or memory on the data acquisition card 76, then the initIOMgr routine returns a handle which is a pointer to the previously allocated data structure. Examples of this indirect coupling manner are parallel ports, serial ports, SCXI ports, the GPIB bus, and the VXI bus, etc. By way of example, if the data acquisition card 76 is coupled to the system by a parallel port, the system processor executes a series of direct input/output instructions to the parallel port, thereby indirectly accessing registers or memory on the data acquisition card 76. If the main routine determines that the data acquisition card 76 is coupled via a parallel port, as at line 39, then the main routine calls the initIOMgrPPData routine at line 40. The initIOMgrPPData routine performs further initialization of the previously allocated IOMgrHndlStructType data structure, as well as other parallel port-specific data structures.

It is common for data acquisition cards, such as the data acquisition card 76 described above, to generate interrupts to the computer system processor 80 to notify the processor of asynchronous events. The portion of the computer control program which is invoked in response to an interrupt from the data acquisition card 76 is commonly referred to as an interrupt service routine. Some operating systems, for example WINDOWS 95, distinguish between programs executing in a user mode and a kernel mode. Interrupt service routines typically run in kernel mode. At line 43 the main routine calls the getISRIOMgrHandle routine, which returns a kernel mode handle to the main routine. The interrupt service routine (not shown) makes use of the kernel mode handle to communicate with the input/output manager.

Input/Output Operation Macros

At line 46 the main routine calls the macro WRITE_REG_8. This is an input/output manager macro which performs an output operation of a single byte to an 8 bit register. The byte written is specified in the third parameter to the macro. The handle associated with the data acquisition card 76 is specified in the first parameter. The offset of the desired register from the data acquisition card 76 base I/O address is specified in the second parameter. An example of the purpose of performing the output operation is to configure a particular register on the card with a given voltage level. Similar macros exist which perform 16 bit and 32 bit output operations, namely WRITE_REG_16 and WRITE_REG_32, respectively. Conversely, macros exist which perform 8, 16 and 32 bit input operations, namely READ_REG_8, READ_REG_16 and READ_REG_32. An example of the purpose of performing an input operation is to acquire data from a register containing a current value, or frequency value, or pressure level, etc. These macros are defined in the iomgr.h header file listed at the end of the specification.

In a typical computer program controlling the data acquisition card 76, numerous input/output operations are performed, i.e., the computer program includes numerous calls to the input/output operation macros. In FIG. 3 a single call to an output operation macro is listed for simplicity.

For clarity, the WRITE_REG_8 macro is defined at lines 5 through 8. The macro makes us of the C language conditional expression operator. The condition is evaluated on line 6 in which a test is performed to determine which type of handle was returned by the initIOMgr routine. If the data acquisition card 76 is directly coupled to the computer system 60 then a call to the IOMgrOutB identifier is made at line 7. The IOMgrOutB identifier is resolved in two different manners, as will be discussed below.

If the data acquisition card 76 is not directly coupled to the computer system 60 then the pointer to the data structure is dereferenced to obtain the function pointed to by the writeReg8 function pointer field in the IOMgrHndlStructType data structure at line 8. Hence, the function is indirectly called to perform the 8 bit register output operation. The function comprises a number of direct output instructions which are executed to perform the output operation. For example, a function to perform an output operation to a parallel port may execute one output instruction to the data register in the parallel port to store the address of a desired register on the data acquisition card 76. The desired register address is not an I/O port address, i.e., not in the I/O address space of the computer system 60, but rather an address in the address space known to the decode logic of the data acquisition card 76. The function then executes another output operation to the parallel port data register with the byte of data to be written to the desired data acquisition card 76 register. Additionally, the function executes numerous input instructions to the parallel port status register and output instructions to the parallel port control register before and after writing the address and data to ensure proper communication protocol with the parallel port. An embodiment is contemplated in which the input/output manager implements the indirect function call as a C++ class.

In one embodiment of the present invention, the computer control program executes on the WINDOWS 95 operating system. In WINDOWS 95, the portion of the computer program which executes in user mode (i.e., at user privilege level) is compiled into a dynamic link library (.DLL) file and the portion which executes in kernel mode (i.e., at kernel privilege level) is compiled in to a virtual device driver (.VXD) file.

As previously mentioned, the IOMgrOutB identifier is resolved in two different manners. The determination is made at compile time, based on preprocessor conditional compilation flags, according to the privilege mode at which the computer program will execute, as shown by the #ifdef C preprocessor directive at line 10. If the computer program will run at a mode privileged to execute direct input/output instructions, such as the portion of the computer program in the .VXD file previously mentioned, then the IOMgrOutB identifier is resolved by the C preprocessor to a call to the outp function, as shown at line 12. The outp function is a library function common to C compilers for x86 architecture microprocessors. The outp function receives the I/O address of the desired register to be written to and the data byte to be written to the desired register. The outp function essentially resolves to an "out" instruction previously described. Hence, if the privilege level is sufficient, and the data acquisition card 76 is directly coupled, the input/output manager macro advantageously performs a direct output operation which is more efficient than other indirect methods.

If the computer program will not run at a mode privileged to execute direct input/output instructions, such as the portion of the computer program in the .DLL file previously mentioned, then the IOMgrOutB identifier gets resolved by the C preprocessor to a call to a function, IOMgrOutB, shown in part at lines 16–26. The IOMgrOutB function receives the I/O address of the desired register to be written to and the data byte to be written to the desired register. The IOMgrOutB function populates a data structure with the register address and data byte value to be output to the data acquisition card 76. The function then invokes the callToKernel routine at line 25, which changes to kernel mode and thus executes at sufficient privilege level to perform the output operation via output instructions.

By providing a single mechanism, i.e., macro for performing a given input or output operation for a given data word width, the input/output manager advantageously alleviates the source code from having substantially more conditional run-time statements and/or conditional compilation directives determined by hardware platform and/or execution environment than would otherwise be necessary. Thus code maintenance is performed at one place, i.e., in the macros of the header files, rather than in many locations throughout the code. Hence, the input/output manager facilitates code maintainability, reusability and portability.

Once the output operation has been completed, the main routine calls the getAndClearIOMgrErr routine at line 49, which returns any errors which occurred during previous input/output operations associated with the handle parameter and clears the errors so that subsequent calls to getAndClearIOMgrErr will only return new errors. The computer program then selectively communicates the errors to the user of the computer program (not shown).

Once the computer program has completed communications with the data acquisition card 76, the main routine calls the freeIOMgr routine at line 52, which frees the memory previously allocated for the instance of the input/output manager data structure associated with the handle passed as a parameter.

It is noted that although an output operation has been described above in detail for clarity and illustration purposes, the present invention additionally comprises input operation functionality, namely via the READ_REG_8, READ_REG_16 and READ_REG_32 macros.

It is noted that although the description of the preferred embodiment has referred to port addresses in the I/O address range, as is common in x86 architecture microprocessor-based computer systems, the invention is not limited to I/O space embodiments. In one embodiment of the present invention the computer control program is compiled for and executes on a "MACINTOSH" computer and the input/output operation macros perform input/output operations via memory-mapped I/O (i.e., instructions which perform load/store operations from/to the memory space of the computer system 60) rather than dedicated "in" or "out" instructions.

The preferred embodiment of the present invention further comprises assembly language implementation equivalents (not shown) of the aforementioned input/output operation macros for interfacing with computer control programs written in assembly or other situations requiring assembly language macros.

Hence, the input/output manager advantageously provides a mechanism for a computer program to communicate with an input/output device in a manner which is independent of how the input/output device is coupled to the computer system 60.

In addition, the input/output manager advantageously provides a mechanism for the development of portable, reusable source code for a computer program to communicate with an input/output device in a manner which is independent of the execution privileges of the computer program on an associated operating system.

Figure 4:
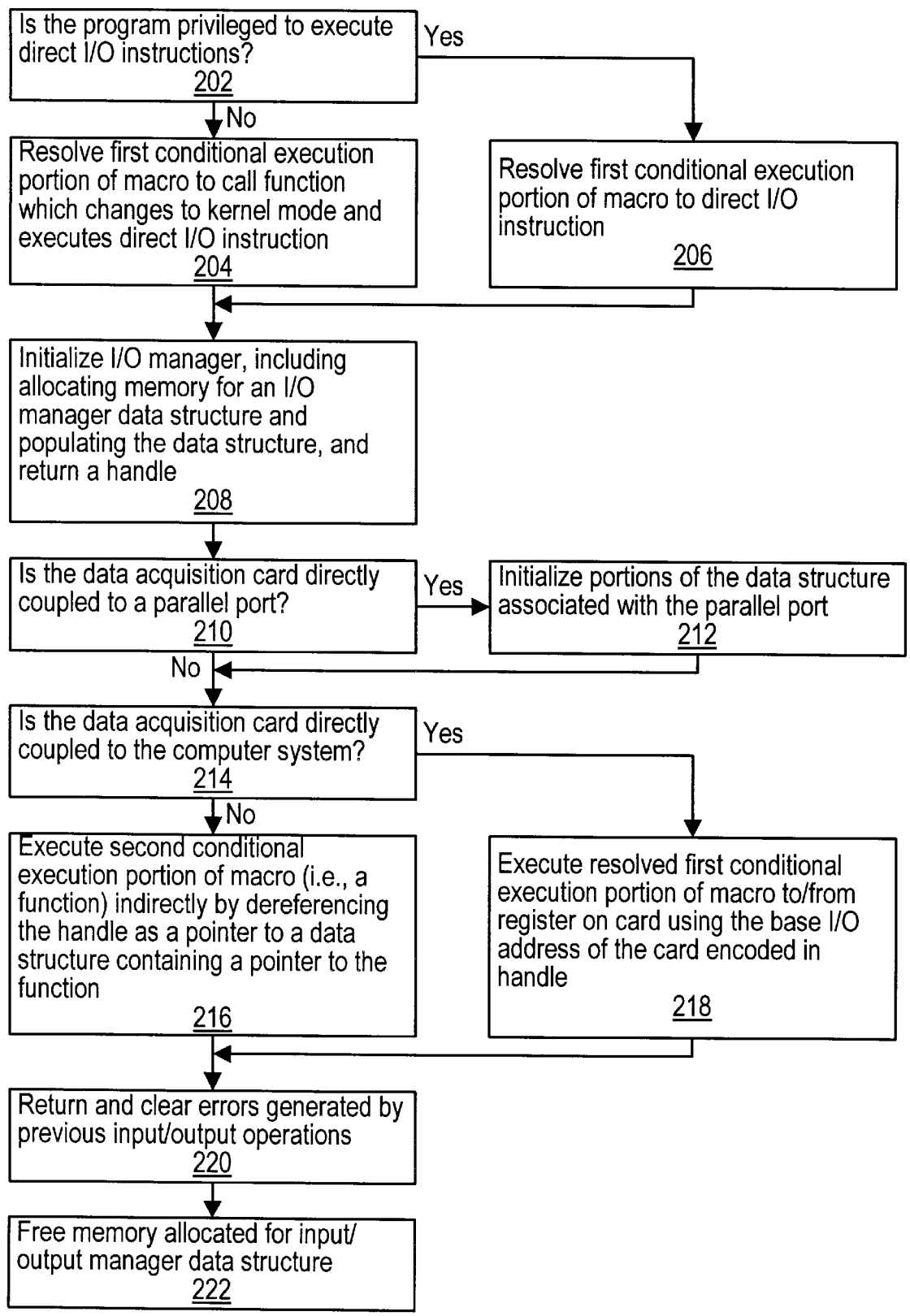
FIG. 4 is a flowchart illustrating the preferred embodiment of the present invention.

FIG. 4—Flowchart Diagram

Referring now to FIG. 4, a flowchart diagram illustrating operation of the preferred embodiment of the present invention are shown. The steps involve compiling one or more source code files into the executable computer program (of FIG. 1) for controlling the data acquisition card 76 (of FIG. 1) and executing the computer program on the computer system 60 (of FIG. 1) to which the data acquisition card 76 is coupled.

A C language preprocessor determines if the computer program will be executed at a sufficient privilege level to execute direct input/output instructions to registers on the data acquisition card 76 in step 202. If so, the preprocessor resolves the first conditional execution portion of an input/output operation macro to execute a direct input/output instruction in step 206. If not, the preprocessor resolves the first conditional execution portion of the input/output operation macro to call a function in step 204 which switches to kernel mode and executes the direction input/output instruction.

Once the computer program has been compiled into executable code, the computer program begins to execute on the computer system 60. The computer program calls an input/output manager initialization routine and receives a handle from the initialization routine in step 208. The initialization comprises allocating memory for an input/output manager data structure associated with the data acquisition card 76 and populating the data structure. The computer program then determines if the data acquisition card 76 is coupled to the computer system 60 through a parallel port in step 210. If so, the computer program calls an input/output manager initialization routine which populates portions of the data structure associated with the parallel port in step 212.

The computer program then determines if the data acquisition card 76 is directly coupled to the computer system 60 in step 214. If so, the computer program executes the first conditional execution portion of the input/output operation macro to/from a register on the data acquisition card 76 in step 218 using the base I/O address of the data acquisition card 76 which is encoded in the handle returned by the input/output manager initialization routine. If not, the computer program executes the second conditional execution portion of the input/output operation macro, which is a function, to perform the input/output operation in step 216. The computer program uses the handle returned by the input/output manager initialization routine as a pointer to the data structure. The data structure contains a function pointer to the function which performs the input/output operation. Next, the computer program calls an error reporting function which returns errors generated by previous input/output operations and clears the errors in step 220. Once the services of the input/output manager are no longer needed, the computer program frees the memory in step 222 which had been previously allocated for the data structure.

Conclusion

Therefore, the present invention comprises a system and method for performing input/output management in a computer system executing a computer program controlling an input/output device, wherein the system and method is independent of the privilege mode in which the computer program executes and the manner in which the input/output device is coupled to the computer system. The computer program is compiled from one or more source code files which contain input/output operation macros, defined in an input/output manager portion of the source code files, for performing input/output operations. The input/output manager thus facilitates code maintainability, reusability and portability.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

Source Code Listing

Below is a partial source code listing of files comprising the preferred embodiment of the input/output manager. The list of source code files includes: iomgr.h, iomgrg.h, iomgrp.h, and iomgrg.c.

---

*iomgr.h*

```
/*--------------------------------------\
| Exported register manager stuff       |
\---------------------------------------*/
#if !defined (__iomgr_h__)
#define __iomgr_h__
#if defined (kMAC)
    #include "macDefines.h"
    #include "sysConfig.h"
#else
    #include "defines .h"
    #include "lptmgr.h"
#endif
#include "iomgrp.h"
/*-----------------------------------------------------------------------\
| The following constants are for the "ioMethod" paramater to            |
| initIOMgr.                                                             |
\-----------------------------------------------------------------------*/
#define IOM_ISA_METHOD          0
#define IOM_NuBUS_METHOD        1
#define IOM_PCI_METHOD          2
#define IOM_PCMCIA_METHOD       3
#define IOM_EPP_METHOD          4
#define IOM_NIBBLE_METHOD       5
/* VXIDAQ begin change [TJH 2/1/95] */
#define IOM_VISA_METHOD         6
/* VXIDAQ end change */
#define IOM_SCXI_PORT_METHOD    8 /* Remote SCXI change [SUNaren
19Dec95] */
typedef u8 *IOMgrHandle;
typedef u8 *IOMgrBaseAddr;
```

```
/*----------------------------------------------------------------\
| This function initializes the register manager and retunrs a handle |
| to be used to read/write registers on the given device in the given |
| mode.                                                           |
\----------------------------------------------------------------*/
DECLARE_FUNCTION (IOMgrHandle, initIOMgr)
(
i32         deviceNum,
IOMgrBaseAddr baseAddress,
i16         ioMethod
);
#if !defined (kMAC)
/*----------------------------------------------------------------\
|/---------------------------------------------------------------\
|| initIOMgrPPData                                               ||
||                                                               ||
|| This function is used to initialize the data needed for parallel ||
|| port communication. The parallel port data is passed to LPTMGR ||
|| to do the read/writes on the parallel port.                   ||
|| The IOMgrHandle is the handle returned by the initIOMgr function. ||
||                                                               ||
|| The initIOMgr function must be called before this one. If multiple ||
|| IO Managers access the same parallel port, the same same parallel ||
|| port data should be given to each of them through this function. ||
||                                                               ||
|| Note: The Macintosh does not have a Parallel Port, so this function ||
|| || is not currently implemented there.                        ||
|\---------------------------------------------------------------/|
\----------------------------------------------------------------*/
DECLARE_FUNCTION (int, initIOMgrPPData)
(
    IOMgrHandle     ioMgr,
    PportInfoStruct *pPortData
);
*endif /* !defined (kMAC) */

/*----------------------------------------------------------------\
|/---------------------------------------------------------------\|
|| freeIOMgr                                                     ||
||                                                               ||
|| Frees the space allocated by the IO Manager. Must be called before
|| NI-DAQ exits.                                                 ||
|\---------------------------------------------------------------/|
\----------------------------------------------------------------*/
DECLARE_FUNCTION (void, freeIOMgr) (IOMgrHandle IOMgr);

/*----------------------------------------------------------------\
| Use the following macros to call the read/write functions from C. |
| C functions should not reference, the function pointers directly |
| because they will be stored in different places on different    |
| platforms.                                                      |
|                                                                 |
| The read macros all return an i32 that contains the data read.  |
| The write macros do not return anything. Use the getAndClearIOMgrErr
| function the check for errors after calls to these macros.     |
\----------------------------------------------------------------*/
#define WRITE_REG_8(handle, regOffset, data) \
    (_IOM_SHORT_CUT (handle) ? \
    IOMgrOutB (_IOM_SHORT_CUT_B_ADDR (handle) + (regOffset), (u8)
(data)) :\
        (*(((IOMgrHndlStruct *) (handle))->writeReg8)) \
        ((IOMgrHndlStructPtr) (handle), (regOffset), (data)))
#define WRITE_REG_16(handle, regOffset, data) \
    (_IOM_SHORT_CUT (handle) ? \
    IOMgrOutW (_IOM_SHORT_CUT_B_ADDR (handle) + (regOffset), (u16)
(data)) :\
        (*(((IOMgrHndlStruct *) (handle))->writeReg16)) \
        ((IOMgrHndlStructPtr) (handle), (regOffset), (data)))
#define WRITE_REG_32(handle, regOffset, data) \
    (*(((IOMgrHndlStruct *) (handle))->writeReg32)) \
        ((IOMgrHndlStructPtr) (handle), (regOffset), (data))
#define READ_REG_8(handle, regOffset) \
    (_IOM_SHORT_CUT (handle) ? \
      IOMgrInB (_IOM_SHORT_CUT_B_ADDR (handle) + (regOffset)) : \
        (*(((IOMgrHndlStruct *) (handle))->readReg8)) \
          ((IOMgrHndlStructPtr) (handle), (regOffset)))
#define READ_REC_16(handle, regOffset) \
    (_IOM_SHORT_CUT (handle) ? \
      IOMgrInW (_IOM_SHORT_CUT_B_ADDR (handle) + (regOffset)) : \
```

```
        (*(((IOMgrHnd1Struct *) (handle))->readReg16)) \
            ((IOMgrHndlStructPtr) (handle), (regOffset)))
#define READ_REG_32(handle, regOffset) \
    (*(((IOMgrHndlStruct *) (handle))->readReg32)) \
        ((IOMgrHndlStructPtr) (handle), (regOffset))
DECLARE_FUNCTION (IOMgrHandle, getISRIOMgrHandle) (IOMgrHandle ioMgr);
DECLARE_FUNCTION (i32, getAndClearIOMgrErr) (IOMgrHandle IOMgr);
*endif /* _iomgr_h_ */
```

*iomgrp.h*

```
/*-------------------------------------------------------------------------\
| This is the private include file for IOMgr.c. It contains data           |
| types and constants for the i16ernal structures of the register          |
| manager. Only register manager files should include it. Include          |
| IOMgr.h to use the register manager.                                     |
\-------------------------------------------------------------------------*/
#if !defined (_iomgrp_h_)
#define _iomgrp_h_
#if defined (IBM)
#include "1ptmgr.h"
#elif defined (kMAC)
#elif defined (SUN)
#endif
#if defined (WINDOWS) || defined (VISRD)
    #define _IOM_SHORT_CUT_HANDLE 0x00010000
#else
    #define _IOM_SHORT_CUT_HANDLE 0xffff0000
#endif
#define _IOM_SHORT_CUT_BITS 0xffff0000
#define _IOM_SHORT_CUT(handle) \
    (((u32) (handle) & _IOM_SHORT_CUT_BITS) == _IOM_SHORT_CUT_HANDLE)
#define _IOM_SHORT_CUT_B_ADDR(handle) ((u16) (((u32) (handle)) &
(~_IOM_SHORT_CUT_BITS)))
#if defined (WIN32)
    #include "iomgrg.h"
#else
    #define IOMgrOutB(reg,val)    (outp((u16) (reg), (val)))
    #define IOMgrInB(reg)         ((i16)inp((u16) (reg)))
    #define IOMgrOutW(reg,val)    (outpw((u16) (reg), (val)))
    #define IOMgrInW(reg)         ((i16)inpw((u16) (reg)))
#endif
typedef struct IOMgrHndlStructType *IOMgrHndlStructPtr;
typedef i16 (*FPwriteReg8)
(
    IOMgrHndlStructPtr rmPtr,
    i32 regOffset,
    i32 data
);
typedef i16 (*FPwriteReg16)
(
    IOMgrHndlStructPtr rmPtr,
    i32 regOffset,
    i32 data
);
typedef i16 (*FpwriteReg32)
(
    IOMgrHndlStructPtr rmPtr,
    i32 regOffset,
    i32 data
);
typedef i8 (*FPreadReg8)
(
    IOMgrHndlStructPtr rmPtr,
    i32 regOffset
);
typedef i16 (*FPreadReg16)
(
    IOMgrHndlStructPtr rmPtr,
    i32 regOffset
);
typedef i32 (*FPreadReg32)
(
    IOMgrHndlStructPtr rmPtr,
    i32 regOffset
);
typedef i32 (*FPgetAndClearErr)
```

-continued

```
(
  IOMgrHndlStructPtr rmPtr
);
typedef struct IOMgrHndlStructType
{
  FPwriteReg8      writeReg8;
  FPwriteReg16     writeReg16;
  FPwriteReg32     writeReg32;
  FPreadReg8       readReg8;
  FPreadReg16      readReg16;
  FPreadReg32      readReg32;
  FPgetAndClearErr getAndClearErr;
  u8               *baseAddress;
  i16              ioMethod;
  i16              boardType;
  i16              deviceNum;     /* VXIDAQ tjh 2/1/96 */
  i16              logicalAddress; /* VXIDAQ BC 3/12/96 */
  /* Following field added for Remote SCXI - [SUNaren 20Dec95] */
  void             *netMgrHandle;
  i16              ackBeforeExecute;
/*------------------------------------------------\
|   platform dependent fields go here             |
\------------------------------------------------*/
  #if defined (kMAC)
     ioFunctionsStruct ioFunctions;
  #elif defined (IBM)
     PportInfoStruct *lptPortInfo;
     struct IOMgrHndlStructType * iomPtr32;
   /* VXIDAQ begin change [TJH 2/1/96] */
     i32 status;
     i32 VISAbaseAddress32; /* kernel mode VXI base address */
     i32 VISAbaseAddress;   /* user mode VXI base address */
     u16 VISAaccessMode;    /* DEREF_VXI_ADDR, IN_AND_OUT,
PEEK_AND_POKE */
     i32 offsetToFirstReg;  /* this can be adjusted: typically 0x20
for A16, 0x180 for A24 */
   /* VXIDAQ end change */
  #endif
} IOMgrHndlStruct;
#endif /* _iomgrp_h_ */
```

---

*iomgrg.h*

```
#if !defined (_iomgrg_h_)
#define _iomgrg_h_
#if defined (WIN32)
   DECLARE_FUNCTION (i16, IOMgrOutB)
   (
      i32 ioAddr,
      i32 data
   );
   DECLARE_FUNCTION (i8, IOMgrInB)
   (
      i32 ioAddr
   );
   DECLARE_FUNCTION (i16, IOMgrOutW)
   (
      i32 ioAddr,
      i32 data
   );
   DECLARE_FUNCTION (i16, IOMgrInW)
   (
      i32 ioAddr
   );
#endif /* WIN32 */
/*
   Device I/O Control Parameter Blocks
*/
#define    IOMGR_IO_IN_WORD               1
#define    IOMGR_IO_OUT_WORD              2
#define    IOMGR_IO_IN_BYTE               3
#define    IOMGR_IO_OUT_BYTE              4
#define    IOMGR_GET_KERNEL_EPPW8         5
#define    IOMGR_GET_KERNEL_EPPW16        6
```

-continued

```
#define        IOMGR_GET_KERNEL_EPPR8                              7
#define        IOMGR_GET_KERNEL_EPPR16                             8
#define        IOMGR_GET_KERNEL_NIBBLEW8                           9
#define        IOMGR_GET_KERNEL_NIBBLEW16                         10
#define        IOMGR_GET_KERNEL_NIBBLER8                          11
#define        IOMGR_GET_KERNEL_NIBBLER16                         12
#define        IOMGR_GET_KERNEL_IOW8                              13
#define        IOMGR_GET_KERNEL_IOW16                             14
#define        IOMGR_GET_KERNEL_IOR8                              15
#define        IOMGR_GET_KERNEL_IOR16                             16
#define        IOMGR_GET_KERNEL_NOSUPPORTR                        17
#define        IOMGR_GET_KERNEL_NOSUPPORTW                        18
#define        IOMGR_GET_KERNEL_LPT_GET_CLEAR_ERR                 19
#define        IOMGR_PPIO_IN_WORD                                 20
#define        IOMGR_PPIO_OUT_WORD                                21
#define        IOMGR_PPIO_IN_BYTE                                 22
#define        IOMGR_PPIO_OUT_BYTE                                23
/* VXIDAQ begin change [TJH 2/1/96] */
#define        IOMGR_GET_KERNEL_VISA_W8                           24
#define        IOMGR_GET_KERNEL_VISA_W16                          25
#define        IOMGR_GET_KERNEL_VISA_W32                          26
#define        IOMGR_GET_KERNEL_VISA_R8                           27
#define        IOMGR_GET_KERNEL_VISA_R16                          28
#define        IOMGR_GET_KERNEL_VISA_R32                          29
/* VXIDAQ end change */
/* Remote SCXI Change [SUNaren 19Dec95] */
#define        IOMGR_GET_KERNEL_SCXI_PORTW8                       30
#define        IOMGR_GET_KERNEL_SCXI_PORTW16                      31
#define        IOMGR_GET_KERNEL_SCXI_PORTR8                       32
#define        IOMGR_GET_KERNEL_SCXI_PORTR16                      33
#define        IOMGR_GET_KERNEL_SCXI_PORT_GET_CLEAR_ERR           34
/* Remote SCXI change end */
typedef u8 *IOHandle; /* MUST match the definition of IOMgrHandle! */
#pragma pack (1)
typedef struct
    {
    /* function ID */
    u16 funcID;
    union
        {
        struct
            {
            /* input */
            i32 ioAddr;
            /* output */
            i32 data;
            i16 err;
            } inWord;
        struct
            /* input */
            i32 ioAddr;
            i32 data;
            /* output */
            i16 err;
            } outWord;
        struct
            {
            /* input */
            i32 ioAddr;
            /* output */
            i32 data;
            i16 err;
            } inByte;
        struct
            {
            /* input */
            i32 ioAddr;
            i32 data;
            /* output */
            i16 err;
            } outByte;
        struct
            {
            /* output */
            void * ioFunc;
            }getKernelIoFunc;
        struct
            {
            /* input */
            IOHandle ioHandle;
```

```
        i32 regOffset;
        /* output */
        i32 data;
        i16 err;
        } PFIOinAccess;
    struct
        /* input */
        IOHandle ioHandle;
        i32 regOffset;
        i32 data;
        /* output */
        i16 err;
        PPIOoutAccess;
      }parameter;
  } iomgrParamBlock;
#pragma pack ()
#endif /* __iomgrg__h__ */
```

---

*iomgrg.c*

```
/*
**************************************************************************
*
* I/O Manager Gate to the Kernel
*
**************************************************************************
*/
#include "ndmaster.h"
#include "iomgr.h"
#include "iomgrg.h"
#include "gatemgr.h"
*/
**************************************************************************
*
* Call the Kernel and write a byte
*
**************************************************************************
*/
DECLARE_FUNCTION (i16, IOMgrOutB)
(
   i32 ioAddr,
   i32 data
)
{
   iomgrParamBlock pb;
   pb.funcID = IOMGR_IO_OUT_BYTE;
   pb.parameter.outByte.ioAddr = ioAddr;
   pb.parameter.outByte.data = data;
   CallToDAQKernel (IO_MANAGER_ID,: &pb, sizeof (iomgrParamBlock));
   return pb.parameter.outByte.err;
}
/*
**************************************************************************
*
* Call the Kernel and read a byte
*
**************************************************************************
*/
DECLARE_FUNCTION (i8, IOMgrInB)
(
   i32 ioAddr
)
{
   iomgrParamBlock pb;
   pb.funcID = IOMGR_IO_IN_BYTE;
   pb.parameter.outByte.ioAddr = ioAddr;
   CallToDAQKernel (IO_MANAGER_ID, &pb, sizeof (iomgrParamBlock));
   return (i8) pb.parameter.outByte.data;
}
*/
**************************************************************************
*
* Call the Kernel and write a word
*
**************************************************************************
*/
DECLARE_FUNCTION (i16, IOMgrOutW)
```

-continued

```
(
  i32 ioAddr,
  i32 data
)
{
  iomgrParamBlock pb;
  pb.funcID = IOMGR_IO_OUT_WORD;
  pb.parameter.outByte.ioAddr = ioAddr;
  pb.parameter.outByte.data = data;
  CallToDAQKernel (IO_MANAGER_ID,; &pb, sizeof (iomgrParamBlock));
  return pb.parameter.outByte.err;
}
/*
 **************************************************************************
 *
 * Call the Kernel and read a word
 *
 **************************************************************************
 */
DECLARE_FUNCTION (i16, IOMgrInW)
(
  i32 ioAddr
)
{
  iomgrParamBlock pb;
  pb.funcID = IOMGR_IO_IN_WORD;
  pb.parameter.outByte.ioAddr = ioAddr;
  CallToDAQKernel (IO_MANAGER_ID, &pb, sizeof (iomgrParamBlock));
  return (i16) pb.parameter.outByte.data;
}
```

I claim:

1. A method for performing input/output management in a computer system which simplifies communication between a computer program executing on said computer system and an input/output device coupled to said computer system, wherein the method is independent of the manner in which said input/output device is coupled to said computer system, comprising:

initializing an input/output manager;
   determining if said input/output device is coupled to said computer system in a first coupling manner or a second coupling manner in response to said computer program initializing said input/output manager;
   wherein said first coupling manner comprises said input/output device being coupled to said computer system such that said input/output device is directly accessible to said computer program through a direct input/output instruction;
   wherein said second coupling manner comprises said input/output device being coupled to said computer system such that said input/output device is not directly accessible to said computer program through a direct input/output instruction; and
   performing an input/output operation to said input/output device after said determining, wherein said performing said input/output operation comprises:
      executing a direct input/output instruction to said input/output device if said determining determines that said input/output device is coupled to said computer system in said first coupling manner; and
      executing a function if said determining determines that said input/output device is coupled to said computer system in said second coupling manner, wherein said function performs said input/output operation.

2. The method of claim 1, wherein said function executes a plurality of direct input/output instructions to perform said input/output operation.

3. The method of claim 1, wherein said executing said function includes calling said function indirectly by dereferencing a pointer to a data structure, wherein said data structure contains a pointer to said function, wherein said data structure further contains data used by said input/output manager.

4. The method of claim 3, further comprising:
   returning a handle in response to said initializing said input/output manager, wherein said handle is said pointer to said data structure.

5. The method of claim 1, further comprising:
   initializing a portion of said input/output manager associated with said second coupling manner of said input/output device to said computer system before said performing said input/output operation if said input/output device is coupled to said computer system in said second coupling manner.

6. The method of claim 1, further comprising:
   returning a handle in response to said initializing said input/output manager, wherein the base address of said input/output device is encoded in said handle, wherein said base address is used to execute said direct input/output instruction.

7. The method of claim 1, further comprising:
   executing an error reporting function after said performing said input/output operation;
   returning errors generated by said performing said input/output operation.

8. The method of claim 7, further comprising:
   clearing said errors in response to said returning said errors.

9. The method of claim 1, further comprising:
   freeing memory in said computer system used by said input/output manager after said performing said input/output operation.

10. The method of claim 1, wherein portions of said computer program comprise assembly language code.

11. The method of claim 1, further comprising:
    receiving a kernel mode handle from said input/output manager after said initializing said input/output manager, wherein said kernel mode handle is used by said computer program to communicate with said input/output manager in kernel mode.

12. A method for performing input/output management in a computer system running an operating system, wherein the method simplifies communication between a computer program executing on said computer system and an input/output device coupled to said computer system, wherein the method is independent of the privilege mode in which said computer program is executing with respect to said operating system, wherein said computer program is compiled from one or more source code files, wherein said one or more source code files contains an input/output operation macro for performing an input/output operation, comprising:

compiling said one or more source code files into said computer program, wherein said compiling comprises:

determining if said computer program is to execute in a first privilege mode or a second privilege mode, wherein in said first privilege mode said computer program is permitted by said operating system to execute a direct input/output instruction to said input/output device, wherein in said second privilege mode said computer program is not permitted by said operating system to execute a direct input/output instruction to said input/output device;

resolving said input/output operation macro to a direct input/output instruction to perform said input/output operation upon determining said computer program is to execute in said first privilege mode; and resolving said input/output operation macro to a call to a function to perform said input/output operation upon determining said computer program is to execute in said second privilege mode, wherein said function changes to said first privilege mode and executes a direct input/output instruction in said first privilege mode.

13. The method of claim 12, further comprising executing said computer program on said computer system.

14. A method for performing input/output management in a computer system running an operating system, wherein the method simplifies communication between a computer program executing on said computer system and an input/output device coupled to said computer system, wherein the method is independent of the privilege mode in which said computer program is executing with respect to said operating system and, wherein the method is independent of the manner in which said input/output device is coupled to said computer system, wherein said computer program is compiled from one or more source code files, wherein said one or more source code files contains an input/output operation macro for performing an input/output operation, comprising:

a) compiling said one or more source code files into said computer program, wherein said compiling comprises:

determining if said computer program is to execute in a first privilege mode or a second privilege mode, wherein in said first privilege mode said computer program is permitted by said operating system to execute a direct input/output instruction to said input/output device, wherein in said second privilege mode said computer program is not permitted by said operating system to execute a direct input/output instruction to said input/output device;

resolving a first conditional execution portion of said input/output operation macro to a direct input/output instruction to perform said input/output operation upon determining said computer program is to execute in said first privilege mode; and resolving said first conditional execution portion of said input/output operation macro to a call to a function to perform said input/output operation upon determining said computer program is to execute in said second privilege mode, wherein said function changes to said first privilege mode and executes a direct input/output instruction in said first privilege mode; and b) executing said computer program on said computer system, wherein said executing comprises:

initializing an input/output manager;

determining if said input/output device is coupled to said computer system in a first coupling manner or a second coupling manner in response to said computer program initializing said input/output manager;

wherein said first coupling manner comprises said input/output device being coupled to said computer system such that said input/output device is directly accessible to said computer program through a direct input/output instruction;

wherein said second coupling manner comprises said input/output device being coupled to said computer system such that said input/output device is not directly accessible to said computer program through a direct input/output instruction;

performing an input/output operation to said input/output device, wherein said performing said input/output operation comprises:

executing said resolved first conditional execution portion of said input/output operation macro if said input/output device is coupled to said computer system in said first coupling manner; and executing a second conditional execution portion of said input/output operation macro if said input/output device is coupled to said computer system in said second coupling manner, wherein said second conditional execution portion is a function which performs said input/output operation.

15. The method of claim 14, wherein said function executes a plurality of direct input/output instructions to perform said input/output operation.

16. The method of claim 14, wherein said executing said second conditional execution portion includes calling said function indirectly by dereferencing a pointer to a data structure, wherein said data structure contains a pointer to said function, wherein said data structure further contains data used by said input/output manager.

17. A method for performing input/output operations to a data acquisition card in a computer system which simplifies communication between a computer program executing on said computer system and a data acquisition card coupled to said computer system, wherein the method is independent of the manner in which said data acquisition card is coupled to said computer system, comprising:

initializing an input/output manager;

determining if said data acquisition card is coupled to said computer system in a first coupling manner or a second coupling manner in response to said computer program initializing said input/output manager;

wherein said first coupling manner comprises said data acquisition card being coupled to said computer system such that said data acquisition card is directly accessible to said computer program through a direct input/output instruction;

wherein said second coupling manner comprises said data acquisition card being coupled to said computer system such that said data acquisition card is not directly accessible to said computer program through a direct input/output instruction;

performing an input/output operation to said data acquisition card, wherein said performing said input/output operation comprises:
  executing a direct input/output instruction to said data acquisition card if said data acquisition card is coupled to said computer system in said first coupling manner; and
  executing a function if said data acquisition card is coupled to said computer system in said second coupling manner, wherein said function performs said input/output operation.

18. A method for performing input/output operations to a data acquisition card in a computer system running an operating system, wherein the method simplifies communication between a computer program executing on said computer system and a data acquisition card coupled to said computer system, wherein the method is independent of the privilege mode in which said computer program is executing with respect to said operating system, wherein said computer program is compiled from one or more source code files, wherein said one or more source code files contains an input/output operation macro for performing an input/output operation, comprising:
  compiling said one or more source code files into said computer program, wherein said compiling comprises:
    determining if said computer program is to execute in a first privilege mode or a second privilege mode, wherein in said first privilege mode said computer program is permitted by said operating system to execute a direct input/output instruction to said data acquisition card, wherein in said second privilege mode said computer program is not permitted by said operating system to execute a direct input/output instruction to said data acquisition card;
    resolving said input/output operation macro to a direct input/output instruction to perform said input/output operation upon determining said computer program is to execute in said first privilege mode; and
    resolving said input/output operation macro to a call to a function to perform said input/output operation upon determining said computer program is to execute in said second privilege mode, wherein said function changes to said first privilege mode and executes a direct input/output instruction in said first privilege mode.

19. A method for performing input/output operations to a data acquisition card in a computer system running an operating system, wherein the method simplifies communication between a computer program executing on said computer system and an data acquisition card coupled to said computer system, wherein the method is independent of the privilege mode in which said computer program is executing with respect to said operating system and, wherein the method is independent of the manner in which said data acquisition card is coupled to said computer system, wherein said computer program is compiled from one or more source code files, wherein said one or more source code files contains an input/output operation macro for performing an input/output operation, comprising:
  a) compiling said one or more source code files into said computer program, wherein said compiling comprises:
    determining if said computer program is to execute in a first privilege mode or a second privilege mode, wherein in said first privilege mode said computer program is permitted by said operating system to execute a direct input/output instruction to said data acquisition card, wherein in said second privilege mode said computer program is not permitted by said operating system to execute a direct input/output instruction to said data acquisition card;
    resolving a first conditional execution portion of said input/output operation macro to a direct input/output instruction to perform said input/output operation upon determining said computer program is to execute in said first privilege mode; and
    resolving said first conditional execution portion of said input/output operation macro to a call to a function to perform said input/output operation upon determining said computer program is to execute in said second privilege mode, wherein said function changes to said first privilege mode and executes a direct input/output instruction in said first privilege mode; and
  b) executing said computer program on said computer system, wherein said executing comprises:
    initializing an input/output manager;
    determining if said data acquisition card is coupled to said computer system in a first coupling manner or a second coupling manner in response to said computer program initializing said input/output manager;
    wherein said first coupling manner comprises said data acquisition card being coupled to said computer system such that said data acquisition card is directly accessible to said computer program through a direct input/output instruction;
    wherein said second coupling manner comprises said data acquisition card being coupled to said computer system such that said data acquisition card is not directly accessible to said computer program through a direct input/output instruction;
    performing an input/output operation to said data acquisition card, wherein said performing said input/output operation comprises:
      executing said resolved first conditional execution portion of said input/output operation macro if said data acquisition card is coupled to said computer system in said first coupling manner; and
      executing a second conditional execution portion of said input/output operation macro if said data acquisition card is coupled to said computer system in said second coupling manner, wherein said second conditional execution portion is a function which performs said input/output operation.

20. A memory media which stores program instructions for performing input/output management in a computer system, wherein the input/output management simplifies communication between a computer program executing on said computer system and an input/output device coupled to said computer system, wherein the program instructions implement:
  determining if said input/output device is coupled to said computer system in a first coupling manner or a second coupling manner;
  wherein said first coupling manner comprises said input/output device being coupled to said computer system such that said input/output device is directly accessible to said computer program through a direct input/output instruction;
  wherein said second coupling manner comprises said input/output device being coupled to said computer system such that said input/output device is not directly accessible to said computer program through a direct input/output instruction; and
  performing an input/output operation to said input/output device after said determining, wherein said performing said input/output operation comprises:

executing a direct input/output instruction to said input/output device if said determining determines that said input/output device is coupled to said computer system in said first coupling manner; and executing a function if said determining determines that said input/output device is coupled to said computer system in said second coupling manner, wherein said function performs said input/output operation.

21. The memory media of claim 20, wherein said function executes a plurality of direct input/output instructions to perform said input/output operation.

22. The memory media of claim 20, wherein said executing said function includes calling said function indirectly by dereferencing a pointer to a data structure, wherein said data structure contains a pointer to said function, wherein said data structure further contains data used by said input/output manager.

23. The memory media of claim 22, further comprising:
returning a handle in response to said initializing said input/output manager, wherein said handle is said pointer to said data structure.

24. The memory media of claim 20, wherein portions of said computer program comprise assembly language code.

25. The memory media of claim 20, wherein said input/output device comprises a data acquisition card.

26. A memory media which stores program instructions for performing input/output management in a computer system running an operating system, wherein the input/output management simplifies communication between a computer program executing on said computer system and an input/output device coupled to said computer system, wherein the input/output management is independent of the privilege mode in which said computer program is executing with respect to said operating system, wherein said computer program is compiled from one or more source code files, wherein said one or more source code files contains an input/output operation macro for performing an input/output operation, wherein the program instructions implement:

compiling said one or more source code files into said computer program, wherein said compiling comprises:
determining if said computer program is to execute in a first privilege mode or a second privilege mode, wherein in said first privilege mode said computer program is permitted by said operating system to execute a direct input/output instruction to said input/output device, wherein in said second privilege mode said computer program is not permitted by said operating system to execute a direct input/output instruction to said input/output device;
resolving said input/output operation macro to a direct input/output instruction to perform said input/output operation upon determining said computer program is to execute in said first privilege mode; and
resolving said input/output operation macro to a call to a function to perform said input/output operation upon determining said computer program is to execute in said second privilege mode, wherein said function changes to said first privilege mode and executes a direct input/output instruction in said first privilege mode.

27. The memory media of claim 26, further comprising executing said computer program on said computer system.

28. The memory media of claim 26, wherein said input/output device comprises a data acquisition card.

29. A memory media which stores program instructions for performing input/output management in a computer system running an operating system, wherein the input/output management simplifies communication between a computer program executing on said computer system and an input/output device coupled to said computer system, wherein the input/output management is independent of the privilege mode in which said computer program is executing with respect to said operating system and, wherein the input/output management is independent of the manner in which said input/output device is coupled to said computer system, wherein said computer program is compiled from one or more source code files, wherein said one or more source code files contains an input/output operation macro for performing an input/output operation, wherein the program instructions implement:

a) compiling said one or more source code files into said computer program, wherein said compiling comprises:
determining if said computer program is to execute in a first privilege mode or a second privilege mode, wherein in said first privilege mode said computer program is permitted by said operating system to execute a direct input/output instruction to said input/output device, wherein in said second privilege mode said computer program is not permitted by said operating system to execute a direct input/output instruction to said input/output device;
resolving a first conditional execution portion of said input/output operation macro to a direct input/output instruction to perform said input/output operation upon determining said computer program is to execute in said first privilege mode; and
resolving said first conditional execution portion of said input/output operation macro to a call to a function to perform said input/output operation upon determining said computer program is to execute in said second privilege mode, wherein said function changes to said first privilege mode and executes a direct input/output instruction in said first privilege mode; and b) executing said computer program on said computer system, wherein said executing comprises:
initializing an input/output manager;
determining if said input/output device is coupled to said computer system in a first coupling manner or a second coupling manner in response to said computer program initializing said input/output manager;
wherein said first coupling manner comprises said input/output device being coupled to said computer system such that said input/output device is directly accessible to said computer program through a direct input/output instruction;
wherein said second coupling manner comprises said input/output device being coupled to said computer system such that said input/output device is not directly accessible to said computer program through a direct input/output instruction;
performing an input/output operation to said input/output device, wherein said performing said input/output operation comprises:
executing the resolved first conditional execution portion of said input/output operation macro if said input/output device is coupled to said computer system in said first coupling manner; and
executing a second conditional execution portion of said input/output operation macro if said input/output device is coupled to said computer system in said second coupling manner, wherein said second conditional execution portion is a function which performs said input/output operation.

30. The memory media of claim 29, wherein said function executes a plurality of direct input/output instructions to perform said input/output operation.

31. The memory media of claim 29, wherein said executing said second conditional execution portion includes calling said function indirectly by dereferencing a pointer to a data structure, wherein said data structure contains a pointer to said function, wherein said data structure further contains data used by said input/output manager.

* * * * *